United States Patent
Takasu et al.

(10) Patent No.: US 10,209,371 B2
(45) Date of Patent: Feb. 19, 2019

(54) RADIATION DETECTOR

(71) Applicant: Kabushiki Kaisha Toshiba, Minato-ku (JP)

(72) Inventors: Isao Takasu, Setagaya (JP); Satomi Taguchi, Ota (JP); Mitsuyoshi Kobayashi, Ota (JP); Atsushi Wada, Kawasaki (JP); Yuko Nomura, Kawasaki (JP); Keiji Sugi, Fujisawa (JP); Rei Hasegawa, Yokohama (JP); Naoto Kume, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/684,303

(22) Filed: Aug. 23, 2017

(65) Prior Publication Data
US 2018/0143329 A1 May 24, 2018

(30) Foreign Application Priority Data

Nov. 21, 2016 (JP) ................. 2016-226284

(51) Int. Cl.
*G01T 1/20* (2006.01)
*G01T 1/203* (2006.01)

(52) U.S. Cl.
CPC ............ *G01T 1/2002* (2013.01); *G01T 1/203* (2013.01); *G01T 1/2018* (2013.01)

(58) Field of Classification Search
CPC ...... G01T 1/2002; G01T 1/203; G01T 1/2018
See application file for complete search history.

(56) References Cited

U.S. PATENT DOCUMENTS

| | | | |
|---|---|---|---|
| 9,455,302 B2 | 9/2016 | Lee et al. | |
| 2009/0026379 A1 | 1/2009 | Yaegashi et al. | |
| 2013/0010930 A1* | 1/2013 | Nishinou | A61B 6/4283 378/167 |
| 2013/0048960 A1 | 2/2013 | Nishino et al. | |
| 2018/0277607 A1 | 9/2018 | Takasu et al. | |
| 2018/0277779 A1 | 9/2018 | Takasu et al. | |

FOREIGN PATENT DOCUMENTS

| | | |
|---|---|---|
| JP | 2013-46042 A | 3/2013 |
| JP | 5235348 B2 | 7/2013 |
| JP | 2015-228535 A | 12/2015 |
| JP | 2016-40823 A | 3/2016 |
| JP | 2018-155720 A | 10/2018 |
| JP | 2018-157170 A | 10/2018 |

* cited by examiner

*Primary Examiner* — Yara B Green
(74) *Attorney, Agent, or Firm* — Oblon, McClelland, Maier & Neustadt, L.L.P.

(57) ABSTRACT

According to one embodiment, a radiation detector includes a scintillator layer, a first conductive layer, a second conductive layer, and an organic layer. The second conductive layer is provided between the scintillator layer and the first conductive layer. The organic layer is provided between the first conductive layer and the second conductive layer. The organic layer includes an organic semiconductor region having a first thickness. The first thickness is 400 nanometers or more.

16 Claims, 7 Drawing Sheets

RADIATION DETECTOR

CROSS-REFERENCE TO RELATED APPLICATIONS

This application is based upon and claims the benefit of priority from Japanese Patent Application No. 2016-226284, filed on Nov. 21, 2016; the entire contents of which are incorporated herein by reference.

FIELD

Embodiments described herein relate generally to a radiation detector.

BACKGROUND

It is desirable to increase the sensitivity of a radiation detector.

DETAILED DESCRIPTION

Figure 1:
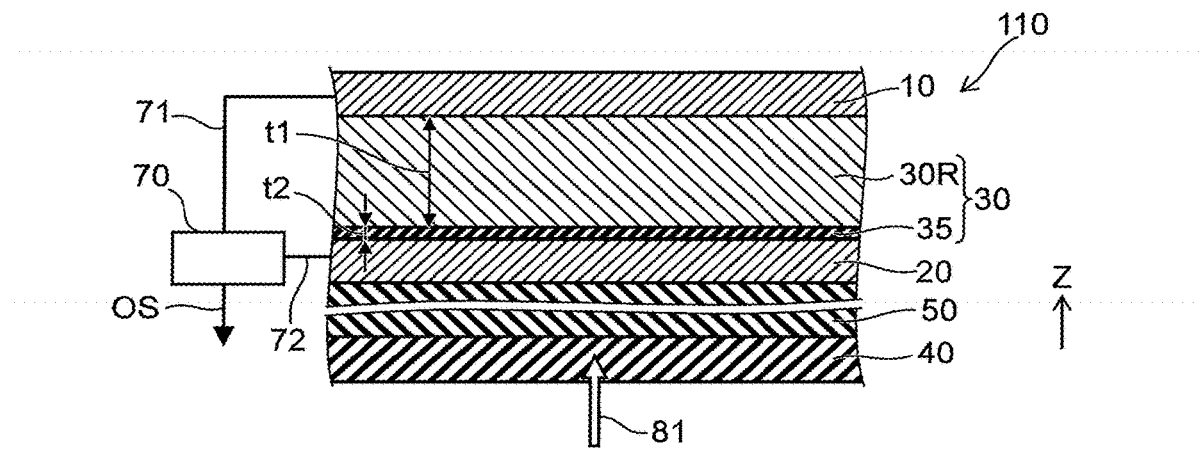
FIG. 1 is a schematic cross-sectional view illustrating a radiation detector according to a first embodiment.

According to one embodiment, a radiation detector includes a scintillator layer, a first conductive layer, a second conductive layer, and an organic layer. The second conductive layer is provided between the scintillator layer and the first conductive layer. The organic layer is provided between the first conductive layer and the second conductive layer. The organic layer includes an organic semiconductor region having a first thickness. The first thickness is 400 nanometers or more.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic cross-sectional view illustrating a radiation detector according to a first embodiment.

As shown in FIG. 1, the radiation detector 110 according to the first embodiment includes a scintillator layer 40, a first conductive layer 10, a second conductive layer 20, and an organic layer 30. A substrate 50 is further provided in the example. In the example, the organic layer 30 includes an organic semiconductor region 30R and an organic intermediate layer 35.

The second conductive layer 20 is provided between the scintillator layer 40 and the first conductive layer 10. The organic layer 30 is provided between the first conductive layer 10 and the second conductive layer 20. The first conductive layer 10 and the second conductive layer 20 function as electrodes.

The substrate 50 is provided between the scintillator layer 40 and the second conductive layer 20. The organic intermediate layer 35 is provided between the second conductive layer 20 and the organic semiconductor region 30R. The organic intermediate layer 35 contacts the organic semiconductor region 30R. The organic intermediate layer 35 contacts the second conductive layer 20.

A direction from the second conductive layer 20 toward the first conductive layer 10 is taken as a Z-axis direction. The Z-axis direction is the stacking direction of the second conductive layer 20, the organic layer 30, and the first conductive layer 10. These layers spread along a plane substantially perpendicular to the Z-axis direction. The scintillator layer 40 also spreads along the plane.

Radiation 81 is incident on the scintillator layer 40. Light is emitted from the scintillator layer 40 according to the radiation 81. The light is incident on the organic layer 30 (the organic semiconductor region 30R) via the substrate 50 and the second conductive layer 20. A movable charge is generated in the organic semiconductor region 30R by the energy of the light. The charge is extracted by applying a bias voltage between the first conductive layer 10 and the second conductive layer 20. The organic semiconductor region 30R functions as, for example, a photoelectric conversion layer.

For example, a detection circuit 70 is provided. The detection circuit 70 is electrically connected to the first conductive layer 10 and the second conductive layer 20. The electrical connection is performed by, for example, a first interconnect 71 that is connected to the first conductive layer 10, and a second interconnect 72 that is connected to the second conductive layer 20. As described below, the detection circuit 70 includes a charge amplifier. The first conductive layer 10 (the first interconnect 71) and the second conductive layer 20 (the second interconnect 72) are electrically connected to the input of the charge amplifier. The output of the charge amplifier is an output signal OS.

For example, the radiation 81 is emitted from an object when detecting contamination due to a radioactive substance. The radiation 81 is faint. There are also cases where the radiation 81 that is emitted is temporally discontinuous. It is desirable to respond with high sensitivity to the radiation 81 having a short pulse form.

For example, there is an imaging element in which a semiconductor photoelectric conversion layer is used. Light (continuous light) is received from the object; and photoelectric conversion is performed by the semiconductor. An electrical signal corresponding to the light is used as imaging data. On the other hand, a photoelectric conversion layer is used also in an X-ray detector for medical care, inspection, etc. In such a case, the object is inspected by intentionally-emitted X-rays irradiated on the object. Accordingly, the timing of the irradiation of the X-rays to be detected is known. Using an imaging element or an X-ray detector such as those recited above, the desired result is obtained even if the response is slow.

Conversely, when detecting contamination due to a radioactive substance, the radiation 81 that is to be detected is temporally discontinuous and is emitted randomly. The timing at which the radiation 81 occurs is unknown. Such a special circumstance exists. Therefore, it is desirable for the radiation detector to respond at high-speed to the radiation 81. It is also desirable to be able to discriminate the radiation 81 having the short pulse form from noise included in the output signal OS of the radiation detector.

In the embodiment, the thickness (a first thickness t1 referring to FIG. 1) of the organic semiconductor region 30R is set to be thick, i.e., 400 nanometers (nm). It was found that a high-speed response is obtained thereby. It was also found that the noise can be reduced by setting the first thickness t1 to be thick. According to the embodiment, a radiation detector can be provided in which the sensitivity can be increased.

For example, it is advantageous for the photoelectric conversion layer to be thin in a general imaging element, an X-ray detector for medical care, inspection, etc. For example, the bias voltage is high in the case where the photoelectric conversion layer is thick. Also, in the case where the photoelectric conversion layer is thick, the time lengthens for the generated charge to move through the photoelectric conversion layer and reach the electrode. Thus, from the perspective of the bias voltage and the movement time of the charge, the thickness of the photoelectric conversion layer generally is set to be thin. For example, the thickness is 200 nm or less. Even in the case where the photoelectric conversion layer and a scintillator layer are combined, it had been considered that setting the thickness of the photoelectric conversion layer to be thick is not beneficial because the distance from the scintillator layer reached by the light is limited.

However, according to experiments of the inventor of the application, it was found that the response of the obtained output signal is faster in the case where the thickness of the photoelectric conversion layer is increased to be 400 nm or more. This is conventionally-unknown. The embodiment is based on this newly-discovered phenomenon. Experiments performed by the inventor will now be described.

A first experiment relates to characteristics of the organic semiconductor region 30R. The samples of the first experiment are as follows. An ITO (Indium Tin Oxide) film that has a thickness of 50 nm is provided as the second conductive layer 20 on a glass substrate 50. The organic intermediate layer 35 that has a thickness of 33 nm is provided on the ITO film. The organic semiconductor region 30R is provided on the organic intermediate layer 35. An aluminum film that has a thickness of 150 nm is provided as the first conductive layer on the organic semiconductor region 30R. The scintillator layer is not provided in the first experiment.

Multiple samples are made in the first experiment. In the multiple samples, the first thickness t1 of the organic semiconductor region 30R is modified to be 80 nm, 150 nm, 300 nm, 500 nm, or 700 nm.

In the first experiment, a subphthalocyanine derivative is used as the organic semiconductor region 30R.

Figure 2A:
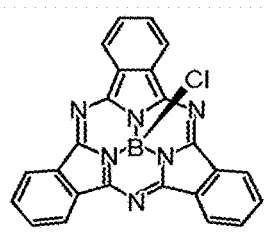
FIG. 2A and FIG. 2B are schematic views illustrating materials included in the radiation detector according to the first embodiment.
Figure 2B:
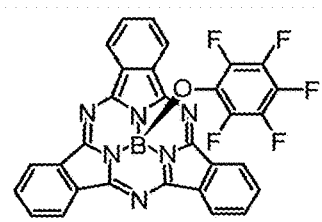

FIG. 2A and FIG. 2B are schematic views illustrating materials included in the radiation detector according to the first embodiment.

A first compound 31 shown in FIG. 2A is chloro boron subphthalocyanine (SubPc). SubPc is of a p-type conductivity. A second compound 32 shown in FIG. 2B is pentafluorophenoxy boron subphthalocyanine (F5-SubPc). F5-SubPc is of an n-type conductivity.

In the first experiment, a mixture of the first compound and the second compound 32 is used as the organic semiconductor region 30R. The volume ratio of the first compound 31 is 0.5; and the volume ratio of the second compound 32 is 0.5.

Light (white light) that has a pulse form is irradiated on such samples; and the current (the photocurrent) that is obtained is observed.

Figure 3A:
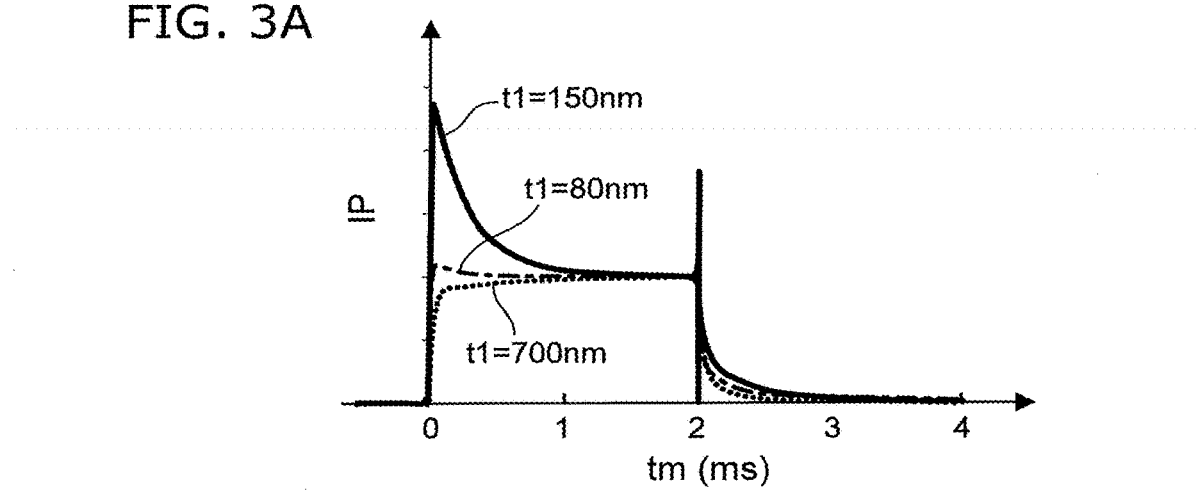
FIG. 3A to FIG. 3C are graphs showing results of the first experiment.
Figure 3B:
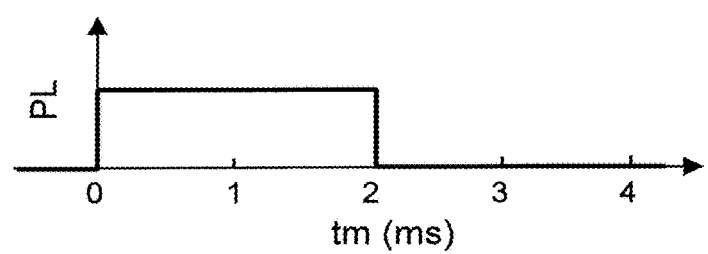
Figure 3C:
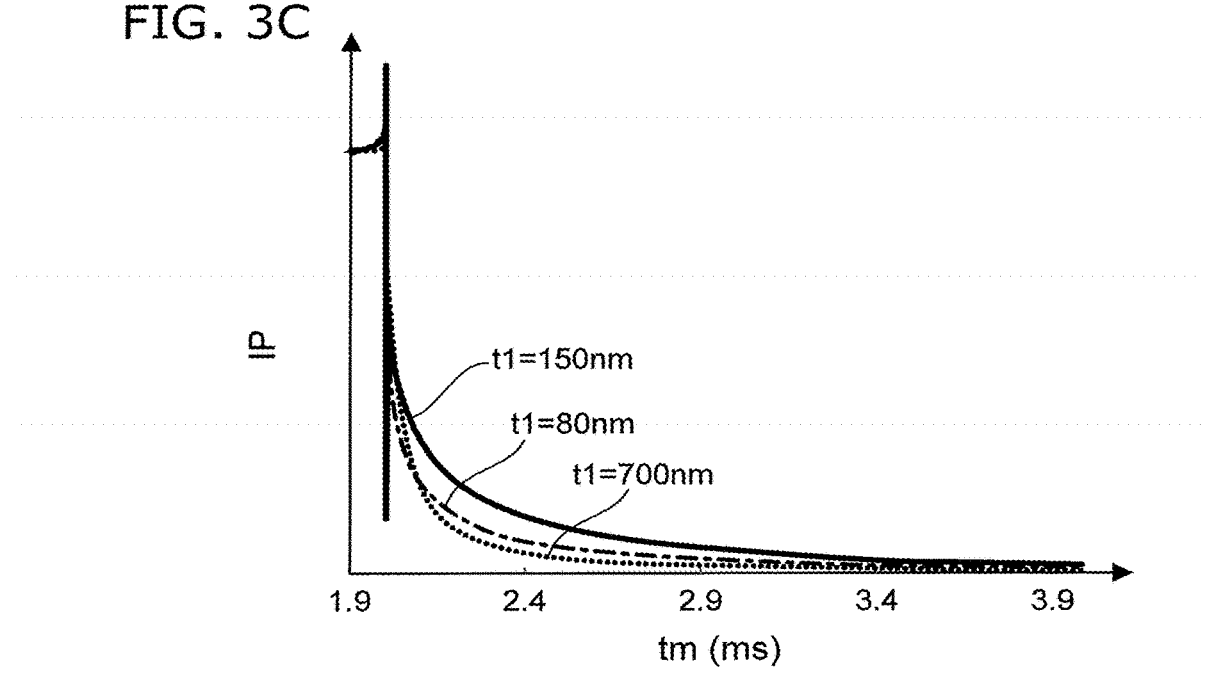

FIG. 3A to FIG. 3C are graphs showing results of the first experiment.

FIG. 3B shows the light that has the pulse form and is irradiated on the samples in the first experiment. FIG. 3A shows the intensity of a photocurrent IP obtained at that time. FIG. 3C is a figure showing an enlargement of the ramp-down portion of the photocurrent IP. In these figures, the horizontal axis is a time tm (ms). The vertical axis of FIG. 3B is an intensity PL of the light. In FIG. 3A and FIG. 3C, the vertical axis is the photocurrent IP. The results for when the first thickness t1 is 80 nm, 150 nm, and 700 nm are shown in FIG. 3A and FIG. 3C.

As shown in FIG. 3B, the light that has a pulse form having a width of 2 ms is irradiated. As shown in FIG. 3A, the photocurrent IP that is obtained in the sample in which the first thickness t1 is 80 nm follows the light having the pulse form. In other words, a fast response is obtained.

On the other hand, in the case where the first thickness t1 is 150 nm, an overshoot at the ramp-up is observed; and the time for the photocurrent IP to stabilize is long. As shown in FIG. 3C, the time for the photocurrent IP to stabilize is long also at the ramp-down. Thus, the response is slow in the case where the first thickness t1 is thick such as 150 nm. This result matches the prediction.

However, as shown in FIG. 3A and FIG. 3C, it was found that a fast response is obtained in the case where the first thickness t1 is 700 nm. This result was not predicted.

Figure 4:
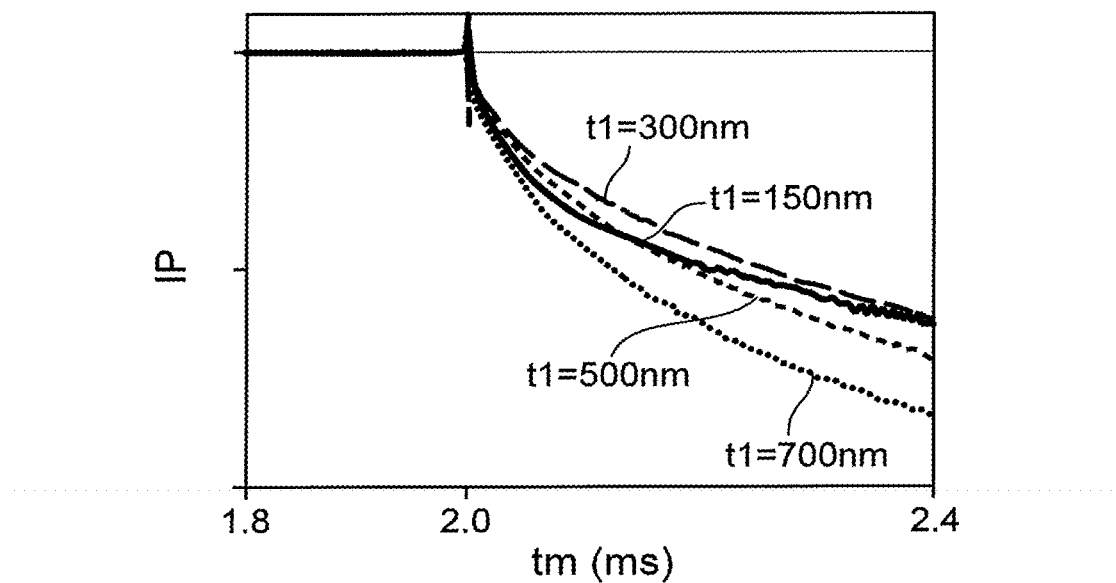
FIG. 4 is a graph showing other results of the first experiment.

The results of detailed measurements of the characteristic of the ramp-down are shown in FIG. 4.

FIG. 4 is a graph showing other results of the first experiment.

FIG. 4 shows the characteristic of the ramp-down of the photocurrent IP. The results in the case where the thickness t1 is 150 nm, 300 nm, 500 nm, and 700 nm are shown in FIG. 4.

As shown in FIG. 4, the response is slower for the thickness t1 of 300 nm than for the thickness t1 of 150 nm. Also, the response is fast in the case where the thickness t1 is 500 nm and 700 nm.

Here, a response time parameter Tc is used as a parameter corresponding to the response speed. The characteristic of the ramp-down illustrated in FIG. 3C and FIG. 4 is focused upon as one example. The response time parameter Tc is taken as the time necessary to reach 10% of the change of the photocurrent IP from the time when the pulse of the light is 0 (when the time tm is 2 ms).

Figure 5:
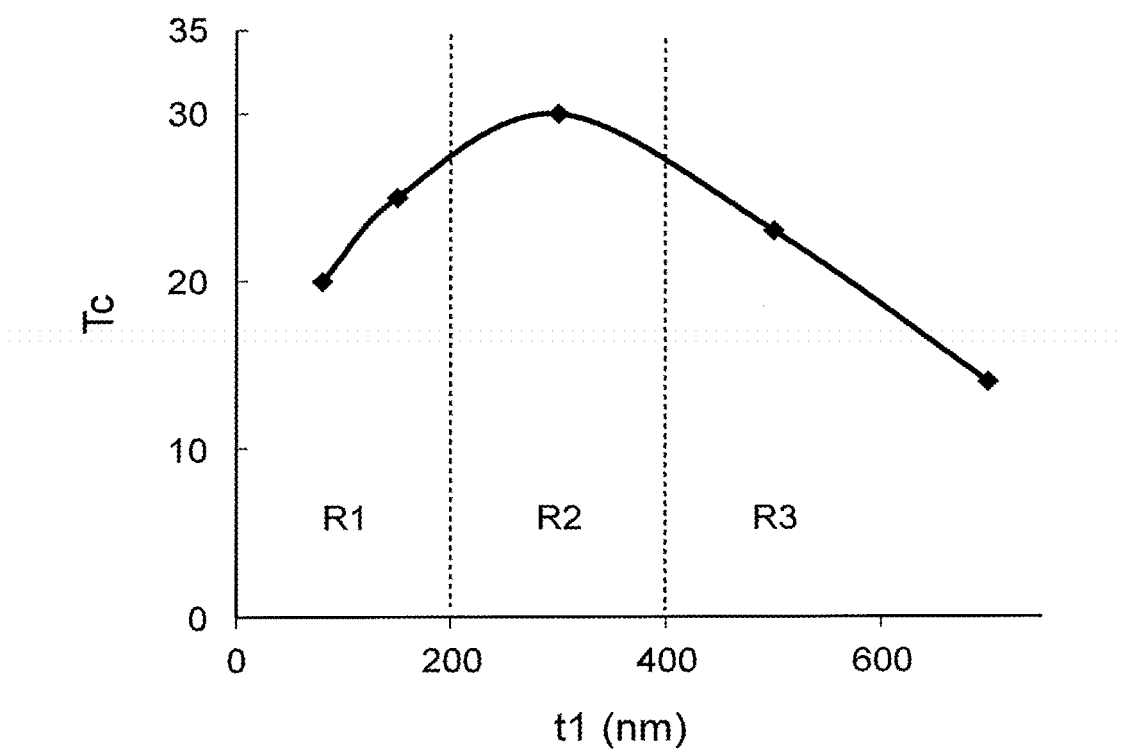
FIG. 5 is a graph showing results of the first experiment.

FIG. 5 is a graph showing results of the first experiment.

The horizontal axis of FIG. 5 is the first thickness t1. The vertical axis is the response time parameter Tc. It is favorable for the response time parameter Tc to be short. FIG. 5 is derived from the results of the first experiment.

It can be seen from FIG. 5 that the response time parameter Tc is small in a first region R1 where the first thickness t1 is 200 nm or less. The response time parameter Tc is large in a second region R2 where the first thickness t1 is greater than 200 nm but less than 400 nm. The response time parameter Tc is small in a third region R3 where the first thickness t1 is 400 nm or more.

In the first region R1, the response time parameter Tc increases as the first thickness t1 increases. This matches the consideration that "the time for the generated charge to move through the photoelectric conversion layer and reach the electrode is longer for a thick photoelectric conversion layer."

As shown in FIG. 5, the small response time parameter Tc that is obtained in the third region R3 where the first thickness t1 is 400 nm or more is the reverse of the consideration recited above.

It is considered that the results obtained in FIG. 5 are caused by the following. The charge that is generated when the light is irradiated on the organic semiconductor region 30R moves toward the electrode. It is considered that the movement time affects the photocurrent IP. Focusing on this mechanism, the response time parameter Tc is large in the case where the first thickness t1 is thick. On the other hand, a capacitance is formed by the two electrodes. It is considered that the charge/discharge characteristic of the capacitance affects the photocurrent IP. The capacitance is small in the case where the first thickness t1 is thick. Therefore, focusing on this mechanism, the response time parameter Tc is small in the case where the first thickness t1 is thick. Due to such two mechanisms, it is inferred that the response time parameter Tc is large when the first thickness t1 is in the second region R2; the response time parameter Tc is small in the first region R1 where the first thickness t1 is smaller than that of the second region R2; and the response time parameter Tc is small in the third region R3 where the first thickness t1 is larger than that of the second region R2.

Thus, from the perspective of the response time parameter Tc, it is favorable to employ the first region R1 or the third region R3. Here, there is also the perspective of noise. As described below, it was found that the noise is large when the first thickness t1 is small.

A second experiment will now be described. In the samples of the second experiment, the scintillator layer 40 is further provided in the samples of the first experiment. The scintillator layer 40 is a CsI(TI) layer having a thickness of about 1 mm. The radiation 81 (the β-rays) is incident on the scintillator layer 40; and the output signal OS is obtained at that time. The β-rays are generated temporally randomly and discretely.

Figure 6:
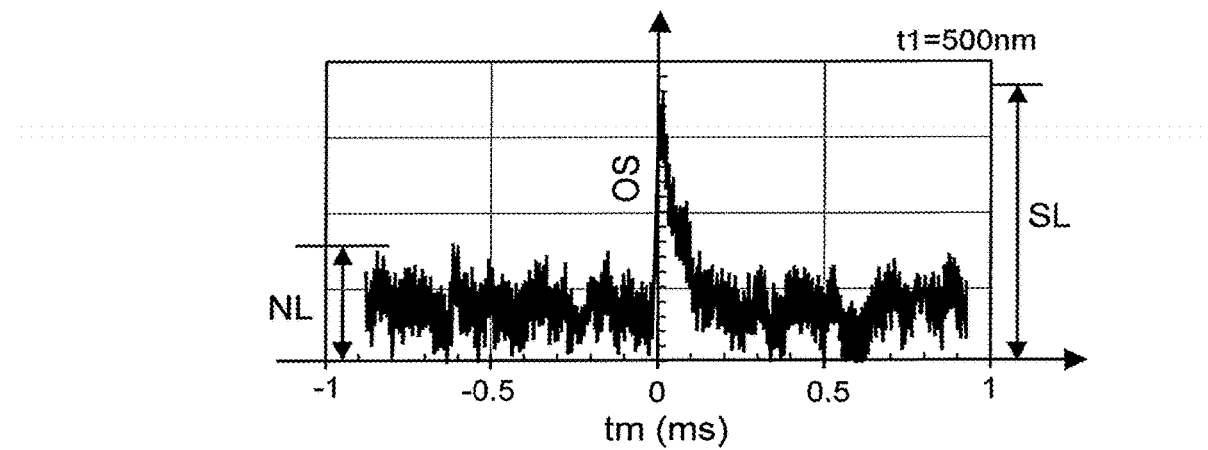
FIG. 6 is a graph showing results of the second experiment.

FIG. 6 is a graph showing results of the second experiment.

FIG. 6 corresponds to a sample in which the first thickness t1 is 500 nm. The horizontal axis of FIG. 6 is the time tm. The vertical axis is the output signal OS. The bias voltage when measuring is −20 V.

As shown in FIG. 6, a large peak and small noise are observed in the output signal OS in the case where the thickness t1 is 500 nm. The large peak corresponds to the incidence of the β-rays. In the output signal OS, it is possible to discriminate between the noise and the peak based on the incidence of the β-rays.

Conversely, the noise is large in the case where the thickness t1 is small (e.g., 80 nm, 150 nm, etc.). For example, the noise and the peak due to the incidence of the β-rays cannot be discriminated in the case where the first thickness t1 is 80 nm.

A noise value NL is introduced as a parameter corresponding to the intensity of the noise. As shown in FIG. 6, the noise value NL is the difference between the maximum value and the minimum value of the noise component of the output signal OS. On the other hand, a signal value SL is introduced as a parameter corresponding to the peak due to the incidence of the β-rays. As shown in FIG. 6, the signal value SL corresponds to the height of the peak due to the incidence of the β-rays.

Figure 7:
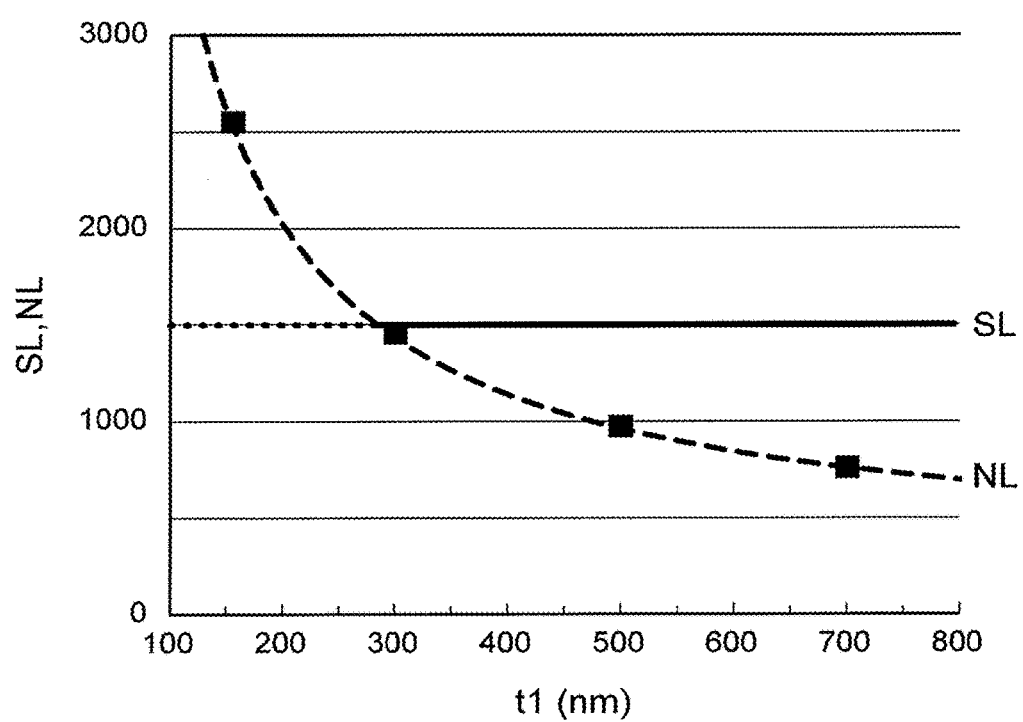
FIG. 7 is a graph showing results of the second experiment.

FIG. 7 is a graph showing results of the second experiment.

The horizontal axis of FIG. 7 is the first thickness t1. The vertical axis is the noise value NL or the signal value SL. As shown in FIG. 7, the noise value NL increases as the first thickness t1 decreases. On the other hand, the signal value SL is substantially constant even when the thickness t1 changes. It can be seen from FIG. 7 that the noise value NL is larger than the signal value SL when the thickness t1 is less than 280 nm. It is difficult to evaluate the β-rays appropriately in this region. The signal value SL is not less than 1.4 times the noise value NL when the thickness t1 is 400 nm or more.

The charge that is obtained from the organic semiconductor region 30R is faint when detecting radiation. Generally, the signal that is obtained from the organic semiconductor region 30R is amplified using an amplifier, etc.; and the amplified signal is transmitted to a signal processor of a subsequent stage. For example, in the case where the signal is amplified using a charge amplifier, the high frequency component of the noise is amplified proportionally to the capacitance of the detector in the operational amplifier of the charge amplifier interior. For example, by setting the first thickness t1 to be thick, the capacitance of the detector decreases; and the noise amplification amount of the high frequency component becomes small. It is inferred therefore that the noise amount of the entirety decreases.

It can be seen from FIG. 5 and FIG. 7 recited above that a small response time parameter Tc and a small noise value NL are obtained when the first thickness t1 is 400 nm or more.

In the embodiment, the first thickness t1 of the organic semiconductor region 30R is set to be thick, i.e., 400 nm or more. Thereby, a high-speed response is obtained. Also, the noise can be reduced.

As described above, when detecting contamination due to a radioactive substance, the radiation 81 that is to be detected is temporally discontinuous and is emitted randomly. The timing at which the radiation 81 occurs is unknown. Such a special circumstance exists. By using the radiation detector 110 having a high-speed response and low noise, the radiation 81 that has the short pulse form can be detected with high sensitivity.

A third experiment will now be described. In the third experiment, the current (the dark current) is measured for the samples of the first experiment in the state in which light is not incident on the samples.

Figure 8:
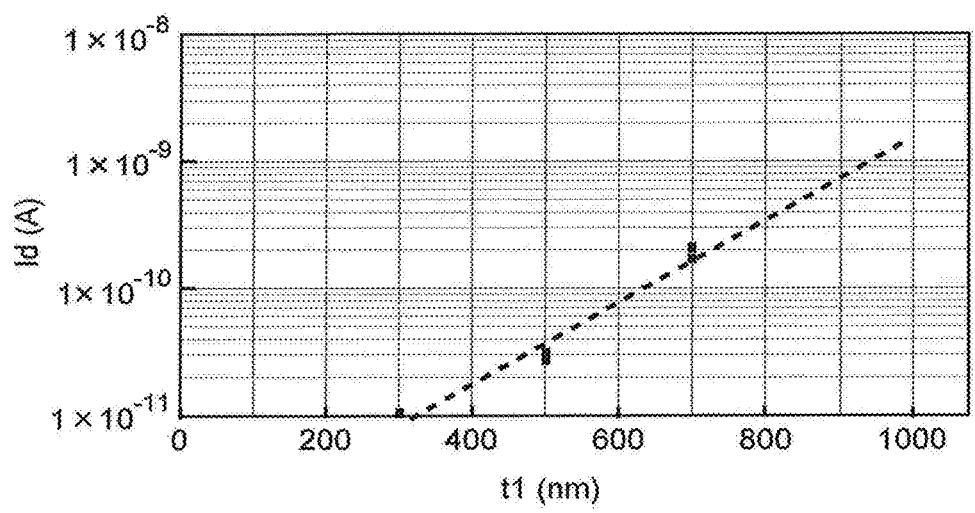
FIG. 8 is a graph showing results of the third experiment.

FIG. 8 is a graph showing results of the third experiment.

The horizontal axis of FIG. 8 is the first thickness t1. The vertical axis is dark current Id (A). The vertical axis is logarithmic.

As shown in FIG. 8, the dark current Id increases as the first thickness t1 increases. For example, the dark current Id exceeds $1 \times 10^{-9}$ A when the first thickness t1 exceeds 1000 nm.

In the embodiment, it is favorable for the first thickness t1 to be, for example, 1 μm or less. Thereby, for example, the dark current Id can be small.

A fourth experiment will now be described. In the fourth experiment, the external quantum efficiency is measured for the samples of the first experiment.

Figure 9:
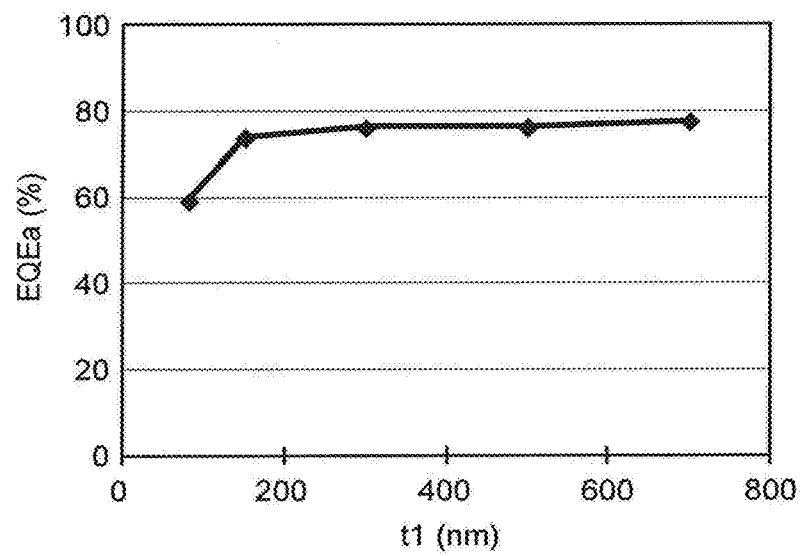
FIG. 9 is a graph showing results of the third experiment.

FIG. 9 is a graph showing results of the third experiment.

The horizontal axis of FIG. 9 is the first thickness t1. The vertical axis is an average external quantum efficiency EQEa (%).

As shown in FIG. 9, the average external quantum efficiency EQEa is low when the first thickness t1 is 80 nm. A high average external quantum efficiency EQEa is obtained when the first thickness t1 is 150 nm or more. In the embodiment, a sufficiently high average external quantum efficiency EQEa is obtained because the first thickness t1 is 400 nm or more.

An example of the organic semiconductor region 30R of the embodiment will now be described.

Figure 10:
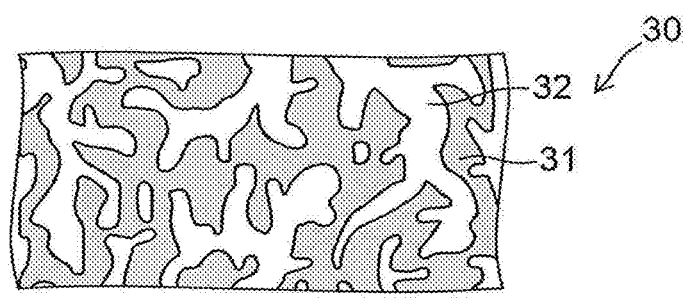
FIG. 10 is a schematic cross-sectional view illustrating a portion of the radiation detector according to the first embodiment.

FIG. 10 is a schematic cross-sectional view illustrating a portion of the radiation detector according to the first embodiment. As shown in FIG. 10, the first compound 31 and the second compound 32 are provided in the organic semiconductor region 30R (the organic layer 30). The first compound 31 includes a first subphthalocyanine derivative (e.g., SubPc). The second compound 32 includes a second subphthalocyanine derivative (e.g., F5-SubPc). Thus, the organic semiconductor region 30R includes, for example, a p-type semiconductor region (e.g., the region of the first compound 31) and an n-type semiconductor region (e.g., the region of the second compound 32).

The two regions are mixed as shown in FIG. 10. For example, the organic semiconductor region 30R has a bulk heterojunction structure.

For example, the amount of the first compound 31 and the amount of the second compound 32 are substantially equal. For example, the concentration (e.g., the volumetric concentration or the volume ratio) of the first compound 31 in the organic semiconductor region 30R is not less than 0.2 times and not more than 5.0 times the concentration (e.g., the volumetric concentration or the volume ratio) of the second compound 32 in the organic semiconductor region 30R.

For example, the volume ratio of the first compound 31 is not less than 0.45 and not more than 0.55. The volume ratio of the second compound 32 is not less than 0.45 and not more than 0.55.

In the embodiment, it is favorable for at least a portion of the organic semiconductor region 30R to be amorphous. Thereby, for example, the uniformity of the organic semiconductor region 30R is high.

In the embodiment, the first thickness t1 is set to be thick, i.e., 400 nm or more. By using an amorphous material, high uniformity is obtained easily even in the case where the first thickness t1 is set to be thick. A high flatness is obtained easily.

In the embodiment, the organic semiconductor region 30R efficiently absorbs light of a designated wavelength. For example, there is a wavelength (an absorption peak wavelength) at which the absorptance has a peak in the organic semiconductor region 30R. The absorption peak wavelength is dependent on the material included in the organic semiconductor region 30R.

For example, the absorption peak wavelength is in the green band in the case where the organic semiconductor region 30R includes a subphthalocyanine derivative. In such a case, it is favorable for the scintillator layer 40 to include CsI(Tl). For example, the scintillator layer 40 includes iodine, cesium, and thallium. In such a case, light in the green band is emitted from the scintillator layer 40.

In the embodiment, it is favorable for light corresponding to the absorption peak wavelength of the organic semiconductor region 30R to be emitted from the scintillator layer 40. Thereby, a high conversion efficiency is obtained.

In the embodiment, it is favorable for the radiation detector 110 to include the organic intermediate layer 35 (referring to FIG. 1). The organic intermediate layer 35 is provided between the second conductive layer 20 and the organic semiconductor region 30R. For example, the organic intermediate layer 35 can suppress the inactivation of the charge generated by the organic semiconductor region 30R. Thereby, the charge is extracted more effectively to the electrode. By providing the organic intermediate layer 35, for example, the flatness improves. For example, uniform characteristics are obtained more easily.

The thickness of the organic intermediate layer 35 (a second thickness t2 referring to FIG. 1) is thinner than the first thickness t1 of the organic semiconductor region 30R. For example, the second thickness t2 is not less than 5 nm and not more than 50 nm. Thereby, for example, the excessive increase of the bias voltage can be suppressed.

In the example, the substrate 50 is provided between the scintillator layer 40 and the second conductive layer 20. The first conductive layer 10, the organic layer 30, and the second conductive layer 20 may be provided between the substrate 50 and the scintillator layer 40. For example, the substrate 50 may not be provided. For example, the scintillator layer 40 may contact the second conductive layer 20. The second conductive layer 20 may contact the organic intermediate layer 35.

In the embodiment, the light that is emitted by the scintillator layer 40 passes through the second conductive layer 20 and is incident on the organic semiconductor region 30R. The second conductive layer 20 is light transmissive in the embodiment. For example, the second conductive layer 20 transmits the light emitted from the scintillator layer 40.

On the other hand, the first conductive layer 10 may be light-reflective. For example, the photoelectric conversion efficiency of the organic semiconductor region 30R is increased by the first conductive layer 10 reflecting the light incident on the organic semiconductor region 30R. For example, the light reflectance of the first conductive layer 10 is higher than the light reflectance of the second conductive layer 20. The light reflectance is the reflectance for the peak wavelength of the light emitted from the scintillator layer 40.

For example, the scintillator layer 40 emits light. The light corresponds to the radiation 81 incident on the scintillator layer 40. The transmittance of the second conductive layer 20 for the peak wavelength of the light is 20% or more. It is desirable for the transmittance to be 60% or more. For example, the light reflectance of the first conductive layer 10 for the peak wavelength is higher than the light reflectance of the second conductive layer 20 for the peak wavelength.

In the embodiment, the scintillator layer 40 may include a plastic scintillator material. The plastic scintillator material includes, for example, at least one selected from the group consisting of polystyrene, polyvinyl toluene, and polyphenyl benzene. For example, the light emission wavelength of the plastic scintillator material is in the green band.

Figure 11:
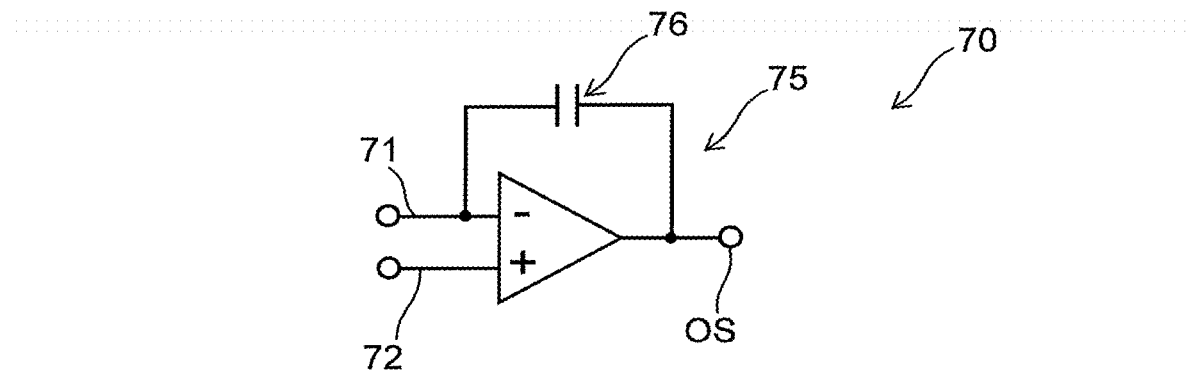
FIG. 11 is a circuit diagram illustrating a portion of the radiation detector according to the first embodiment.

FIG. 11 is a circuit diagram illustrating a portion of the radiation detector according to the first embodiment.

FIG. 11 illustrates a charge amplifier 75 provided in the detection circuit 70. The first interconnect 71 (i.e., the first conductive layer 10) is electrically connected to one of the two input terminals of the charge amplifier 75. The second interconnect 72 (i.e., the second conductive layer 20) is electrically connected to the other of the two input terminals of the charge amplifier 75. A capacitance 76 is connected between the negative input of the charge amplifier 75 and the output terminal of the charge amplifier 75. For example, a voltage that corresponds to the charge generated between the first conductive layer 10 and the second conductive layer 20 is obtained as the output signal OS.

In the charge amplifier 75, a resistor may be provided in parallel with the capacitance 76. An input terminal of a reference voltage may be further provided.

Figure 12:
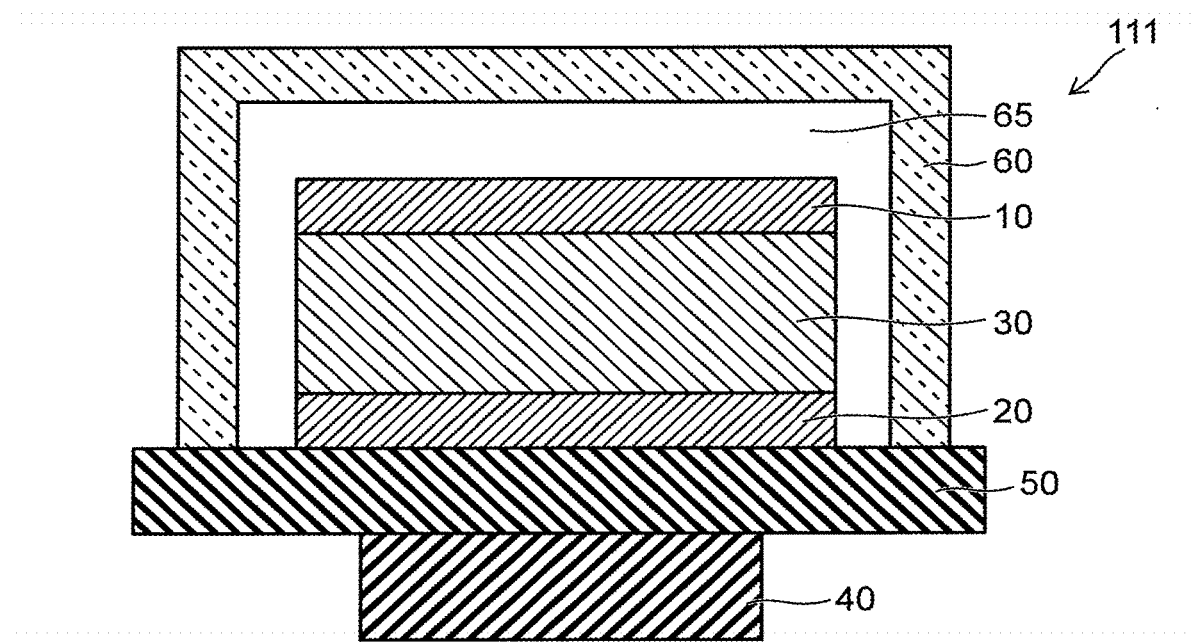
FIG. 12 is a schematic cross-sectional view illustrating another radiation detector according to the first embodiment.

FIG. 12 is a schematic cross-sectional view illustrating another radiation detector according to the first embodiment.

In the other radiation detector 111 according to the embodiment as shown in FIG. 12, a sealing member 60 is further provided in addition to the scintillator layer 40, the first conductive layer 10, the second conductive layer 20, the organic layer 30 (the organic semiconductor region 30R), and the substrate 50. The substrate 50 and the sealing member 60 include, for example, glass. The outer edge of the sealing member 60 is bonded to the outer edge of the substrate 50. The first conductive layer 10, the second conductive layer 20, and the organic layer 30 are provided in the space surrounded with the substrate 50 and the sealing member 60. The first conductive layer 10, the second conductive layer 20, and the organic layer 30 are sealed airtightly with the substrate 50 and the sealing member 60. Thereby, stable characteristics are obtained more easily. High reliability is obtained.

A space 65 is provided between the sealing member 60 and the first conductive layer 10, between the sealing member 60 and the second conductive layer 20, and between the sealing member 60 and the organic layer 30. For example, an inert gas (e.g., a nitrogen gas or the like) is sealed in the space 65.

Second Embodiment

Figure 13:
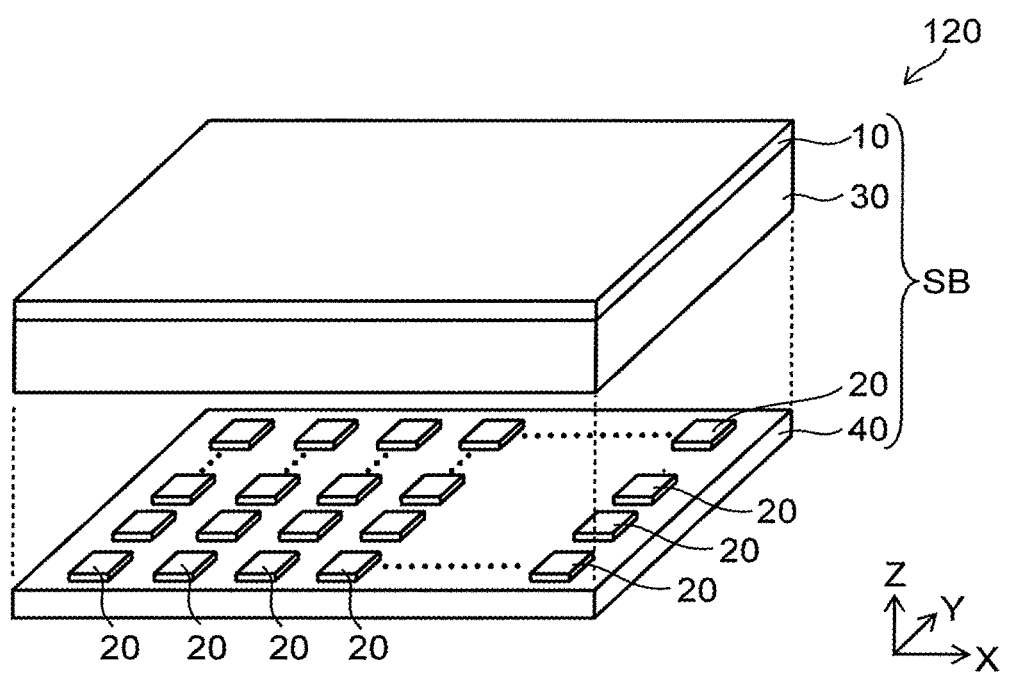
FIG. 13 is a schematic cross-sectional view illustrating a radiation detector according to a second embodiment.

FIG. 13 is a schematic cross-sectional view illustrating a radiation detector according to a second embodiment.

As shown in FIG. 13, the scintillator layer 40, the first conductive layer 10, the second conductive layer 20, and the organic layer 30 are provided in the radiation detector 120. The substrate 50 and the organic intermediate layer 35 may be further provided. In FIG. 13, some of the components included in the radiation detector 120 are drawn as being separated from each other for easier viewing of the drawing.

The second conductive layer 20 is multiply provided in the radiation detector 120. The multiple second conductive layers 20 are arranged along a plane (e.g., the X-Y plane) crossing a first direction (the Z-axis direction) from the scintillator layer 40 toward the first conductive layer 10. The X-Y plane is perpendicular to the Z-axis direction.

The multiple second conductive layers 20 are arranged along, for example, an X-axis direction and a Y-axis direction. For example, the multiple second conductive layers 20 are arranged in a matrix configuration.

An image that corresponds to the radiation 81 is obtained in the radiation detector 120. The configurations described in reference to the first embodiment and modifications of the configurations are applicable to the radiation detector 120. In the radiation detector 120 as well, a radiation detector can be provided in which the sensitivity can be increased.

According to the embodiments, a radiation detector can be provided in which the sensitivity can be increased.

In this specification, the state of being electrically connected includes the state in which two conductors are in direct contact. The state of being electrically connected includes the state in which two conductors are connected by another conductor (e.g., an interconnect, etc.). The state of being electrically connected includes the state in which a switching element (a transistor, etc.) is provided in a path between two conductors so that a state in which a current flows in the path between the two conductors is formable.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in radiation detectors such as scintillator layers, conductive layers, organic layers, organic semiconductor regions, organic intermediate layers, detection circuits, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all radiation detectors practicable by an appropriate design modification by one skilled in the art based on the radiation detectors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A radiation detector, comprising:
   a scintillator layer;
   a first conductive layer;
   a second conductive layer provided between the scintillator layer and the first conductive layer; and
   an organic layer provided between the first conductive layer and the second conductive layer, the organic layer including an organic semiconductor region having a first thickness, the first thickness being more than 500 nanometers and not more than 1 micrometer.

2. The detector according to claim 1, wherein the organic semiconductor region includes an n-type semiconductor region and a p-type semiconductor region.

3. The detector according to claim 1, wherein the organic semiconductor region includes a first compound including a first subphthalocyanine derivative, and a second compound including a second subphthalocyanine derivative.

4. The detector according to claim 3, wherein the scintillator layer includes iodine, cesium, and thallium.

5. The detector according to claim 3, wherein the scintillator layer includes a plastic scintillator material.

6. The detector according to claim 3, wherein a concentration of the first compound is not less than 0.2 times and not more than 5.0 times a concentration of the second compound.

7. The detector according to claim 1, wherein at least a portion of the organic semiconductor region is amorphous.

8. The detector according to claim 1, wherein the second conductive layer is light transmissive.

9. The detector according to claim 1, further comprising an organic intermediate layer contacting the organic semiconductor region and being provided between the second conductive layer and the organic semiconductor region.

10. The detector according to claim 9, wherein a second thickness of the organic intermediate layer is thinner than the first thickness.

11. The detector according to claim 10, further comprising a substrate provided between the scintillator layer and the second conductive layer.

12. The detector according to claim 10, wherein
the scintillator layer contacts the second conductive layer, and
the second conductive layer contacts the organic intermediate layer.

13. The detector according to claim 9, wherein a second thickness of the organic intermediate layer is not less than 5 nanometers and not more than 50 nanometers.

14. The detector according to claim 1, wherein a light reflectance of the first conductive layer is higher than a light reflectance of the second conductive layer.

15. The detector according to claim 1, wherein
the scintillator layer emits light corresponding to radiation incident on the scintillator layer, and
a transmittance of the second conductive layer for a peak wavelength of the light is 20 percent or more.

16. The detector according to claim 15, wherein a light reflectance of the first conductive layer for the peak wavelength is higher than a light reflectance of the second conductive layer for the peak wavelength.

* * * * *